United States Patent [19]

Megy et al.

[11] 4,351,809

[45] Sep. 28, 1982

[54] PROCESS FOR REDUCING PHOSPHATE ORE

[75] Inventors: Joseph A. Megy, Mission Viejo; Robert A. Hard, Laguna Beach, both of Calif.

[73] Assignee: Occidental Research Corporation, Irvine, Calif.

[21] Appl. No.: 265,305

[22] Filed: May 20, 1981

[51] Int. Cl.$^3$ ............................................. C01B 25/01
[52] U.S. Cl. .................................... 423/167; 423/304; 423/323
[58] Field of Search ....................... 423/304, 323, 167

[56] References Cited

U.S. PATENT DOCUMENTS

| | | | |
|---|---|---|---|
| 2,974,016 | 3/1961 | Horton et al. | 423/323 |
| 3,076,248 | 2/1963 | Darrow et al. | 423/167 |
| 3,235,330 | 2/1966 | Lapple | 423/167 |
| 3,241,917 | 3/1966 | Lapple | 423/304 |
| 3,335,094 | 8/1967 | Darby | 423/323 |
| 3,363,976 | 1/1968 | Vondrasek | 423/132 |
| 3,558,114 | 1/1971 | Saeman | 423/304 |
| 3,679,363 | 7/1972 | Skrivan | 423/323 |
| 3,760,048 | 9/1973 | Sullivan et al. | 423/167 |

*Primary Examiner*—O. R. Vertiz
*Assistant Examiner*—Wayne A. Langel
*Attorney, Agent, or Firm*—Walter A. Hackler

[57] ABSTRACT

A process for reducing phosphate ore includes beneficiating phosphate ore to reduce alumina impurities while allowing fluoride impurities to remain in the beneficiated ore, mixing beneficiated ore with solid carbonaceous material to form a porous bed of agglomerated feed and heating the porous bed in a rotary-type kiln to produce elemental phosphorus and carbon monoxide. The elemental phosphorus may be burned within the kiln to provide heat to the porous bed and an inert gas may be purged through the porous bed to drive the reaction between the phosphate ore and the solid carbonaceous material towards complete reduction of the phosphate ore by removal of carbon monoxide from the porous bed.

20 Claims, 8 Drawing Figures

PROCESS FOR REDUCING PHOSPHATE ORE

The present invention pertains generally to the reduction of phosphate ores and more particularly, the invention is useful for producing phosphorus pentoxide from fluorapatite ore without defluorinating the ore. The phosphorus pentoxide may be hydrated to produce phosphoric acid.

Production of phosphoric acid and/or other phosphate products from phosphate ores, such as fluorapatite may be accomplished either by adding a strong acid, preferably sulfuric acid, to the ore to yield an insoluble calcium sulfate $CaSO_4$ and an impure phosphoric acid solution, or reducing the phosphate in the ore with carbon to yield elemental phosphorus gas. The phosphorus gas may be burned with oxygen to form phosphorus pentoxide ($P_2O_5$) which is thereafter absorbed in water to form relatively pure phosphoric acid.

The latter process of reducing phosphate ore with carbon to produce elemental phosphorus gas may be accomplished in an electric arc furnace which can supply the heat at high temperature (1400°–1600° C.) necessary to reduce the phosphate ore. Alternatively, the phosphate ore may be reduced in a rotary kiln type furnace such as described by Lapple in U.S. Pat. Nos. 3,235,330 and 3,241,917.

In the rotary kiln furnace process for producing phosphorus pentoxide, a reaction bed comprised of fluorapatite ore, carbonaceous material and silica balls is heated to reductively extract elemental phosphorus which in turn is burned over the reaction bed to provide the endothermic heat necessary in the reduction reaction between the carbon and the phosphate ore. This is more energy efficient than producing phosphorus pentoxide using an electric-arc furnace because in the latter, the reduced elemental phosphorus must be burned separately to form phosphorus pentoxide and the heat of oxidation therefrom is not effectively recovered.

Although the rotary kiln process for the reduction of phosphate ore with solid carbon has been known for some time as evidenced by the herein referenced patents, the process has heretofore not been commercially practical because of poor phosphorus yield therefrom.

To enhance the reductive reaction between the phosphate ore and the carbonaceous material, the ore is first beneficiated to remove impurities, and then ground and pressed, or formed, into feed balls along with carbonaceous material and silica. The grinding and compression of the ore, carbonaceous material and silica into balls, or pellets, promotes intimate contact therebetween in order to promote the reduction reaction.

It is also well known that, in general, at higher temperatures the reduction reaction between phosphorus ore and carbon occurs faster and yields more phosphorus, however, the temperature must be restricted to avoid excessive melting of the kiln solids with the formation of "clinkers" which may interfere with kiln performance. Clinkers may be defined as aggomerated portions of the porous bed caused by melting within the bed.

It is also known (Lapple) that impurities such as fluorine act as fluxing agent causing the reaction bed to melt at lower temperatures, such lower temperatures resulting in a slower reduction rate of the phosphate ore. The raw material mixtures of beneficiated phosphate ore, carbonaceous material, and silica should not melt at the temperature required for the reduction reaction. As the reduction reaction proceeds, phosphorus and carbon monoxide gases are evolved from the fluorapatite liberating CaO and $CaF_2$ to combine with $SiO_2$ in the feed to form mixtures which give melting problems at some ($CaO/SiO_2$) mole ratios in the residue. As the reduction reaction proceeds, CaO and $CaF_2$ are liberated from the fluorapatite, which changes the ($CaO/SiO_2$) mole ratio in the kiln residue from silica rich to silica lean during the course of the reduction. Heretofore, in order to reduce melting of the reaction bed, the ore was defluorinated; however, this process is expensive and may preclude economic operation of the process.

To supply the endothermic heat requirements of the reduction reaction at high temperatures, considerable high temperature heat is necessary. This requires high gas flow rates and an oxidizing condition in the kiln gases over the bed. Such high gas flow rates relate to another major problem in the kiln furnace process, namely, the difficulty in separating the reducing bed comprising phosphate ore, silica, and carbonaceous material from the overlaying oxidizing zone where burning of the phosphorus occurs. Contact of the oxidizing zone with the bed causes oxidation of carbon in the bed (carbon burnout) or oxidation of phosphorus within the bed, thus reducing the yield, or amount, of phosphorus extracted from the ore.

Previous attempts to provide separation between the reacting bed and the oxidation zone, included the adding of a bedding coke to the reaction bed together with the feed balls of phosphate ore, carbonaceous material, and silica. If the coke tended to float or rise to the surface of the bed of ore balls, a physical barrier between the ore balls and the oxidizing atmosphere would be established, however, recent experiments have found that the balls tended to be carried by the kiln rotation to the top of the bedding coke and that carbon burnout of the balls is actually enhanced.

An alternate approach to overcome carbon burnout due to premature oxidation of the carbon in the feed balls is to replace such carbon by adding more reducing agent or fuel into the bed during the process.

In the case of iron ore reduction, this may be accomplished by the addition of a reducing agent such as carbon monoxide or a fuel which decomposes, in part, to carbon monoxide, through ports disposed around the periphery of a rotary kiln. Such a process is described in U.S. Pat. No. 3,753,682, where a hydrocarbon fuel such as natural gas ($CH_4$) is introduced under the bed. This type of process uses ported rotary kilns, well known in the art such as those described by U.S. Pat. Nos. 3,182,980; 3,847,538; 3,945,624; and 4,070,149 among others.

However, for phosphate ore, carbon monoxide is not a sufficiently strong reducing agent to release the phosphorus. For these ores a solid carbonaceous material is a preferred reducing agent, carbon monoxide being effectively an inert gas with regard to the reduction of phosphate ore.

Heretofore, none of the efforts involving rotary kiln processes for the production of phosphoric acid or phosphorus pentoxide have been efficient with regard to extracting a major portion of the phosphorus from the phosphate ore.

The present invention is directed to a process for reducing phosphate in phosphate containing ores and producing a phosphorus pentoxide, which may then be rehydrated to form phosphoric acid, at a very efficient rate in a ported rotary kiln without the necessity of using bedding coke within the kiln or defluorination of the phosphate ore.

Further, the process enables the use of a shorter rotary kiln than previous processes because the reduction process proceeds at a more rapid rate to more complete reduction of the phosphorus pentoxide. Since less time at high temperature is required, a shorter kiln may be used which substantially reduces both capital cost and operating cost.

SUMMARY OF THE INVENTION

The present invention is directed to a process for reducing phosphate ore including fluoride and alumina impurities and generally comprises the steps of beneficiating the phosphate containing ore to reduce the alumina impurities therein, to less than approximately three percent by weight, said fluoride impurities remaining in the beneficiated phosphate ore, mixing the beneficiated phosphate ore with silica and solid carbonaceous material in amounts to produce a feed mixture having a $CaO/SiO_2$ mole ratio within the range of about 2.5 to about 5.0, forming the feed mixture into agglomerates, and, heating, by exposure to a flame, a porous bed of the agglomerates to a temperature sufficient to reduce the phosphate ore in the feed mixture by reaction with the solid carbonaceous material to form elemental phosphorus vapor without substantial melting of the porous bed.

It has been found that there exists in the $CaO\text{-}SiO_2\text{-}CaF_2$ phase diagram a region of $CaO/SiO_2$ mole ratios in which $CaF_2$ has appreciable solid solubility at the reaction temperature of interest. This solid solubility of $CaF_2$ in the $CaO\text{-}SiO_2$ matrix effectively inhibits $CaF_2$ from acting as a fluxing agent in forming a melt in the porous reaction bed.

In addition, the elemental phosphorus vapor may be oxidized, or burned, within an oxidation zone over the porous bed to both produce phosphorus pentoxide and heat to heat the porous bed, thereby providing the endothermic energy necessary for the reduction of the phosphate ore within the bed.

In particular, the invention is directed to the production of phosphorus pentoxide utilizing a rotary type kiln and rotating the kiln in order to agitate the porous bed to enhance the heat transfer within the porous bed. Additionally, inert gas may be purged through the porous bed to drive the reaction between the phosphate ore and the solid carbonaceous material towards complete reduction of the phosphate ore by removal of carbon monoxide and the elemental phosphorus vapor from the porous bed, said inert gas being non-reactive with the phosphate ore, carbonaceous material, elemental phosphorus vapor, and the carbon monoxide. Alumina impurities are limited as hereinabove mentioned and, a refractory with limited alumina is used to line the rotary kiln.

BRIEF DESCRIPTION OF THE DRAWINGS

The advantages and features of the present invention will be better understood by the following description and drawings in which.

DETAILED DESCRIPTION

Figure 1:
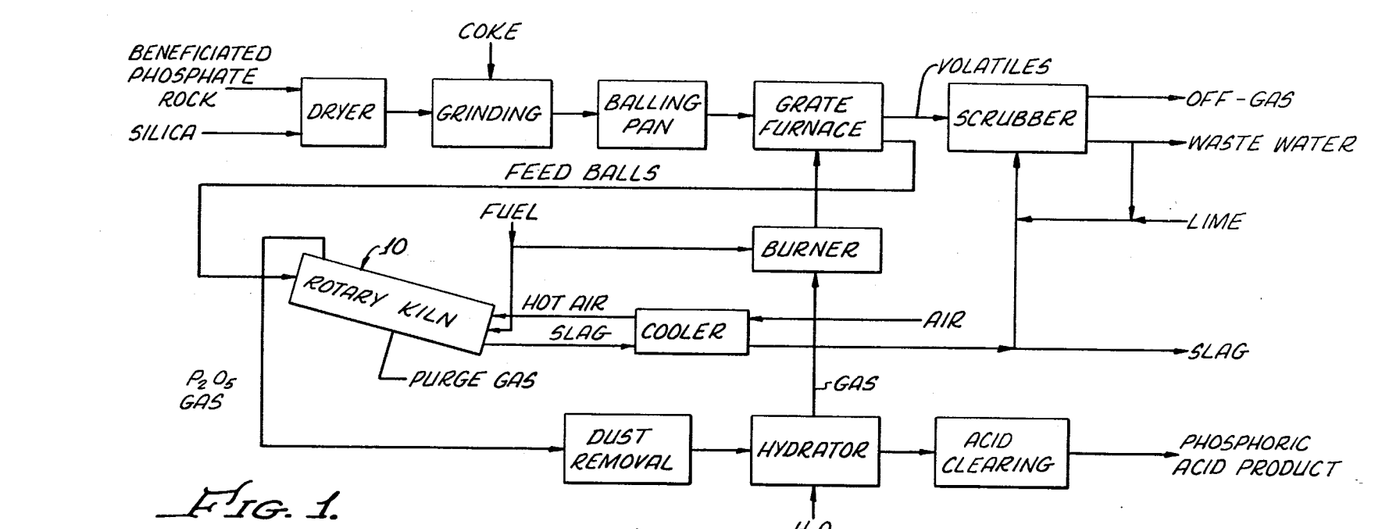
FIG. 1 is a block-diagram of a rotating kiln process for the production of phosphoric acid showing a rotary kiln for the production of phosphorus pentoxide ($P_2O_5$) and associated process apparatus.

Turning now to FIG. 1, there is generally shown, in block-diagram form, a rotating kiln process for the production of phosphoric acid. The following description of the process is provided as background information to provide a better understanding of the present invention.

In general, phosphate rock, or ore, suitable for use in a rotary kiln process must be beneficiated using current industry practices. Typical impurities, such as iron, sodium, potassium, and aluminum generally adversely affect the process and most of these impurities are removed by beneficiation of the ore which generally includes screening the ore to remove coarse material therefrom, elutriation to remove clay materials, fatty acid flotation to separate phosphate ore from the clay impurities and large silica particles, and finally an amine flotation to separate the fine silica from the phosphate ore. Since a kiln phosphoric acid process may require a higher silica level than is left in the ore after conventional beneficiation, it may be possible to omit the last step.

Of particular importance to the process is the presence of fluorine impurity in the fluorapatite ore, as the fluorine content may act as a flux causing melting and/or clinkering of the ore when mixed with carbonaceous material and silica and heated to reaction temperatures.

The importance of the removal of fluorine values from the ore has been recognized and, in fact, removal from the ore has proved to be expensive, and may render the entire process uneconomical. In the present process it has been found that defluorination, or removal of fluorine impurities, is unnecessary when the molar amount of silica is controlled and the amount of alumina impurity is limited or reduced to less than approximately 3% by weight of the reaction bed. It has been found that the $CaO/SiO_2$ ratio should be between about 2.5 and about 5 and preferably between about 3 and about 4.

The reductive extraction of phosphorus from the beneficiated ore is the result of the reaction between phosphate ore, such as fluorapatite, solid carbonaceous material such as coke or coal, and silica, namely, $Ca_{10}(PO_4)_6F_2$ + carbon + silica + 12,700 BTU (per lb of phosphorus)→phosphorus gas + carbon monoxide + calcium silicate, these reactants should be held in close proximity to each other during the course of the reaction at the proper relative concentration of each reactant. Hence, it is preferred that the feed materials be agglomerated. This agglomeration also reduces dust within the kiln and reduces clinker formation which may occur if small individual particles of a loose feed material of ore silica and coke were fed into the rotary kiln.

Feed balls are prepared by drying the beneficiated phosphate ore and silica, grinding the beneficiated phosphate ore, silica, and coke either together or separately and forming the mixture into generally spherical balls with a conventional balling pan, which are then fed to a grate furnace to drive off any volatile materials contained therein. As shown in FIG. 1, gases driven off of the grate furnace are passed for elimination from the system and the preheated feed balls are fed into a ported rotary kiln 10. Solid residue, or slag, is removed from the rotary kiln and passed through a cooler for cooling the residue and simultaneously heating input air for the rotary kiln 10. Product gas, or vapor, $P_2O_5$, is removed from the rotary kiln and passed through a dust removal stage and a hydrater to form phosphoric acid and thereafter cleaned to produce a product phosphoric acid as is well known in the art.

Figure 2:
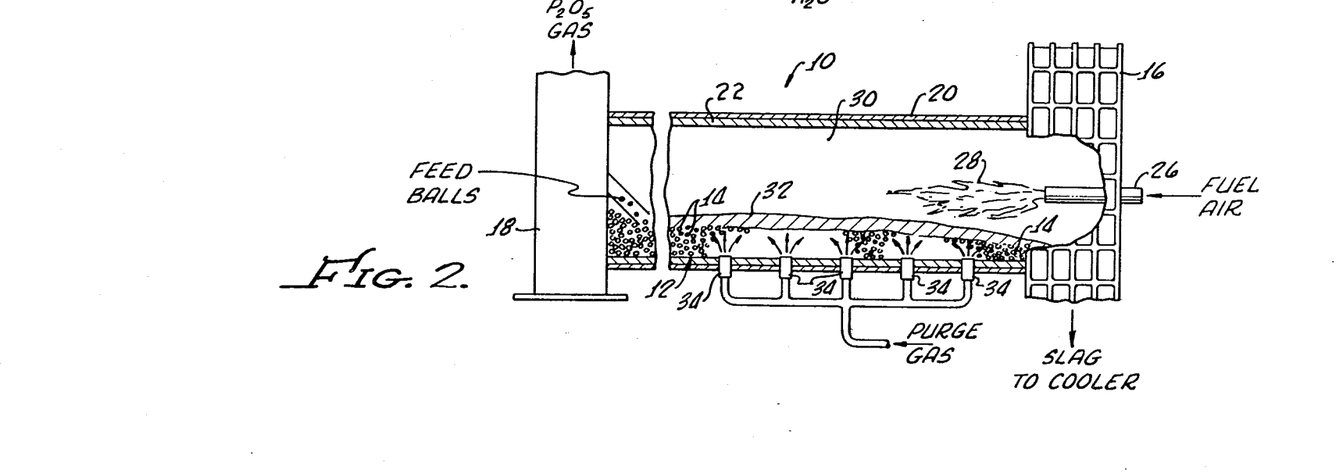
FIG. 2 is a diagram of a ported kiln for carrying out the process of the present invention broken away to show a number of ports for introducing an inert purge gas through a porous bed of ore balls disposed within the kiln and showing a boundary layer of inert gas established between the porous bed of ore balls and the flame and oxidation zone disposed above the porous bed.

FIG. 2 more particularly illustrates a ported kiln 10 for carrying out the process of the present invention. Although it may be possible to carry out the present invention utilizing a traveling grate or the like, a rotary kiln is particularly adapted for the reduction of phosphate ores because of its efficiency in transferring heat directly to a porous bed 12 consisting of feed balls 14 as hereinabove described. The rotating kiln may be of conventional design, having stationary end portions 16, 18, and a rotating center section, or cylinder 20 interconnected therewith, mechanism for rotating the cylinder 20 not being shown in FIG. 2.

The melting temperature of the reaction bed with the hereinabove mentioned $CaO/SiO_2$ ratio also is decreased markedly as alumina impurity content increases in the kiln solids. Alumina impurities can originate as a component of the ore, in the refractories used in the kiln, or as a component of the carbonaceous material ash. The role of the alumina in promoting melting is particularly severe in the high $CaO/SiO_2$ mole ratio kiln residue, which has solid solubility for $CaF_2$.

Because alumina plays an important role in the present process and its presence should be controlled, the rotary kiln 10 should be lined with a refractory 22 having a low alumina content.

The refractory must be able to withstand the high temperatures of the process (typically higher than approximately 1000° C.) and not contribute or add alumina to the porous bed 12 during operation.

Typical refractories recommended for known rotary kiln process, such as for phosphate ore nodualization, are unsuitable because of their alumina content. Such refractories undergo a reaction with the reacted solids residue which form a melt precluding kiln operation. The formation of the melt is promoted by fluoride which is present in the kiln residue. Magnesia refractories were found to be unsuitable as they react with phosphorus pentoxide present in the kiln gas phase to form magnesium phosphate which leads to rapid deterioration of the refractories. Most magnesia-chrome refractories are bonded with fosterite (magnesium silicate). These refractories were found to be unsuitable as the fosterite reacts with calcia in the reacted solids residue to form calcium silicate. This reaction leads to rapid deterioration of the refractories as the binder is destroyed.

It has been found that refractories should be low alumina magnesia-chrome refractories with at least approximately 7% by weight of $Cr_2O_3$ and that the effective bonding agent in the refractories should be basic calcium silicate and preferably dicalcium silicate. Refractories meeting the criteria, such as Narco 608DB, are commercially available refractories.

Fuel and air, or oxygen, are fed to a burner 26 which produces a flame 28 for directly heating the porous bed 12. It is to be appreciated that the term "flame" within the meaning of this specification includes either the luminous portions of an oxidizing reaction, the hot gases associated therewith, or both.

For start-up, a conventional fuel may be used to preheat the kiln center portion 20 and the porous bed 12, but as the reaction in the bed produces elemental phosphorus vapor and carbon monoxide less fuel is required and sufficient air, or oxygen, must be provided to oxidize the phosphorus and the carbon monoxide, above the bed in an oxidation zone 30. As will be hereinafter discussed in greater detail, an inert purge gas such as nitrogen is forced through the porous bed 12 in order to carry the reaction products of phosphorus and carbon monoxide from the bed and into the oxidizing zone 30 thereby promoting or causing more complete reduction of the phosphate ore in the porous bed. In addition, sufficient purging gas is forced through the bed to establish a boundary layer 32 of inert gas separating the oxidizing zone 30 and the porous bed 12 in order to reduce, or inhibit, oxidation of carbonaceous material, or coal, phosphorus and carbon monoxide within the porous bed.

It should be appreciated that while the boundary layer 32 is shown in FIG. 2 to have significant thickness, this has been done for the purpose of illustrating the boundary layer 32 and that the oxidation zone 30 above the bed 12 may contain high velocity gases from the flame 28 which may cause the boundary layer to be very thin over the bed 32 but still inhibit the oxidation of carbonaceous material, phosphorus and carbon monoxide within the bed 12.

The inert purging gas is introduced through a number of ports, or nozzles, such equipment being well known in the art. Not shown in FIG. 2 is conventional equipment for regulating the purge gas through the nozzles 34 so that such gas is only introduced into the rotary kiln when the nozzles 34 lie beneath the porous bed 12.

The present invention is particularly directed to a process for the reduction of phosphate ores such as fluorapatite ($Ca_{10}(PO_4)_6F_2$), the reduction reaction being generalized as:

$Ca_{10}(PO_4)_6F_2 + 15C + 9XSiO_2 \rightarrow 15CO + (3/2)P_4 + 9[CaO \cdot XSiO_2] + CaF_2$, where $0 \leq x \leq 1$.

Little reaction kinetic information has been known regarding the hereinabove noted reduction reaction for phosphorus oxide. This may be due to the fact that prior furnace techniques for the reduction of phosphorus oxides proceeded in the molten phase. Hence, kinetic studies in the literature were concerned with liquid phase reduction. In the process of concern of this invention, however, the melting of the solids in the feed balls 14 within the bed 12 leads to agglomeration, or clinkering, of the feed balls, which cause undesirable material handling problems in the operation of rotary-type kilns, and inhibits the reduction reaction thus producing less phosphorus yield from the feed.

The effect of the reaction product carbon monoxide partial pressure on the rate and extent of phosphorus removal from the ore was experimentally found through the use of a typical thermogravimetric analyzer (TGA), not shown, consisting of an electronic balance, a closed furnace, temperature control, gas mixing system, sample boat, and a recording system. The analyzer, which is typical of those well known in the art, measures the weight of a material and its rate of change continuously, either as a function of increasing temperature or preselected temperature over a period of time. The gas mixing system, not shown, includes a flow meter and means for passing nitrogen gas, carbon monoxide, or a mixture thereof, past ore ball samples, not shown, to regulate the partial pressure of carbon monoxide surrounding the ore ball samples while they are heated within the closed furnace.

Phosphate rock, green coke, and silica having a composition as shown in Table 1 were individually ground and formed into approximately one (1) gram, ⅜ inch diameter, sample ore balls, each ball having a CaO to $SiO_2$ mole ratio of approximately 3.2 and a carbon to $P_2O_5$ mole ratio of approximately 10.

TABLE 1

| Material Analysis for Sample Ore Balls | | | |
|---|---|---|---|
| Material | Mesh Size | Analysis | |
| Phosphate Rock | −325 | CaO | 45.2% |
|  |  | $P_2O_5$ | 32.0% |
|  |  | $SiO_2$ | 6.0% |
|  |  | $Al_2O_3$ | 0.96% |
|  |  | MgO | 0.33% |
|  |  | $Fe_2O_3$ | 0.76% |
|  |  | F— | 3.7% |
| Green Coke | −325 | Fixed Carbon | 89.5% |
|  |  | Volatiles | 10.5% |
| Silica | −325 | $SiO_2$ | 97.7% |

The Sample balls were dried at 110° C. and thermogravimetric analysis was then performed with the thermogravimetric analyzer on the samples isothermally at a number of temperatures from 1300° to 1500° C.

Figure 3A:
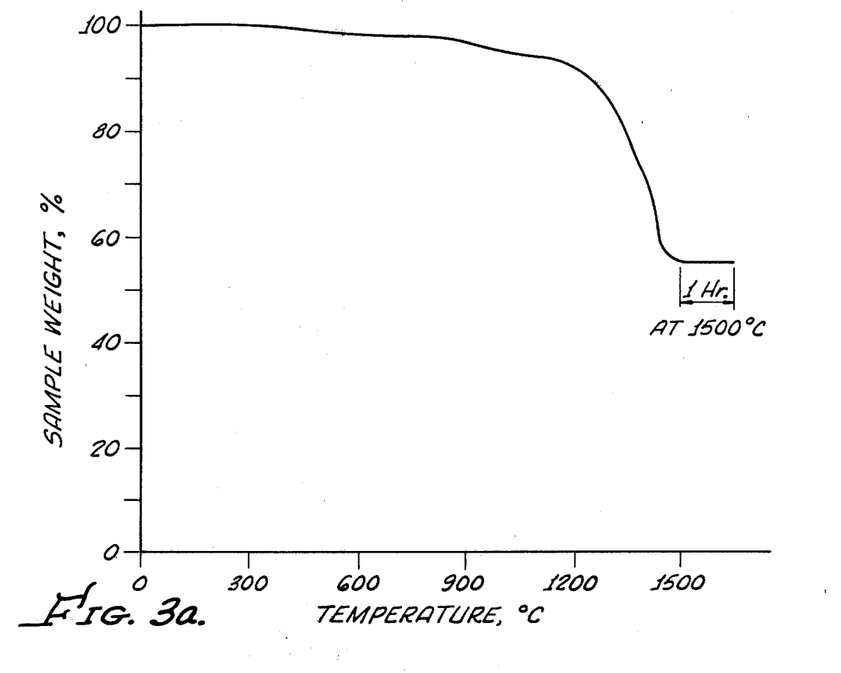
FIG. 3A is a plot representing the percent weight of sample ore balls as a function of temperature when heated at a rate of approximately 5° C. per minute from about 25° to about 950° C. and at a rate of approximately $2\frac{1}{2}$° C., per minute from about 950° C. to about 1500° C. in a pure carbon monoxide atmosphere.
Figure 3B:
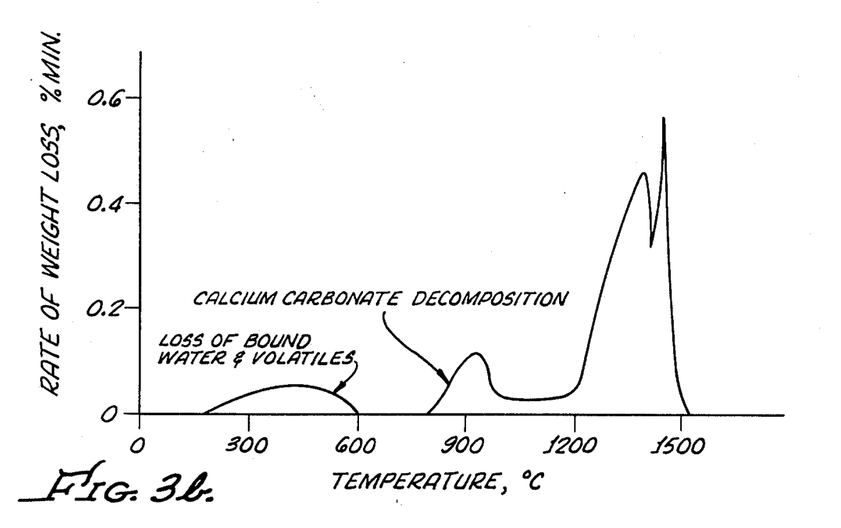
FIG. 3B is a plot representing the rate of change of the curve shown in FIG. 3A and indicating the derivative of weight loss of sample ore balls versus temperature change.

Results of the thermogravimetric analysis (TGA) which included heating the ore balls at a rate of 5° C. per minute from 25° to 950° C. and thereafter at 2½° C. per minute from 950° to 1500° C. in a pure carbon monoxide atmosphere are shown in FIGS. 3A and 3B.

In FIG. 3A and 3B the instantaneous sample weight, in percent of initial weight, and rate of weight loss, in percent, with time are plotted as a function of temperature, respectively.

It should be noted that the secondary reactions, such as the dehydration of bound water, volatilization of organic matters, and calcium carbonate decomposition among others are observed before the reduction reaction of interest, which may concurrently proceed with minor reactions such as the volatilization of sodium fluoride and potassium fluoride. FIG. 3A shows the gross sample weight as a function of temperature and is indicative of the average weight loss of each pellet versus temperature and FIG. 3B shows the rate of weight loss in percent per minute as a function of temperature, the latter curve being a derivative of the curve shown in 3A.

Figure 4:
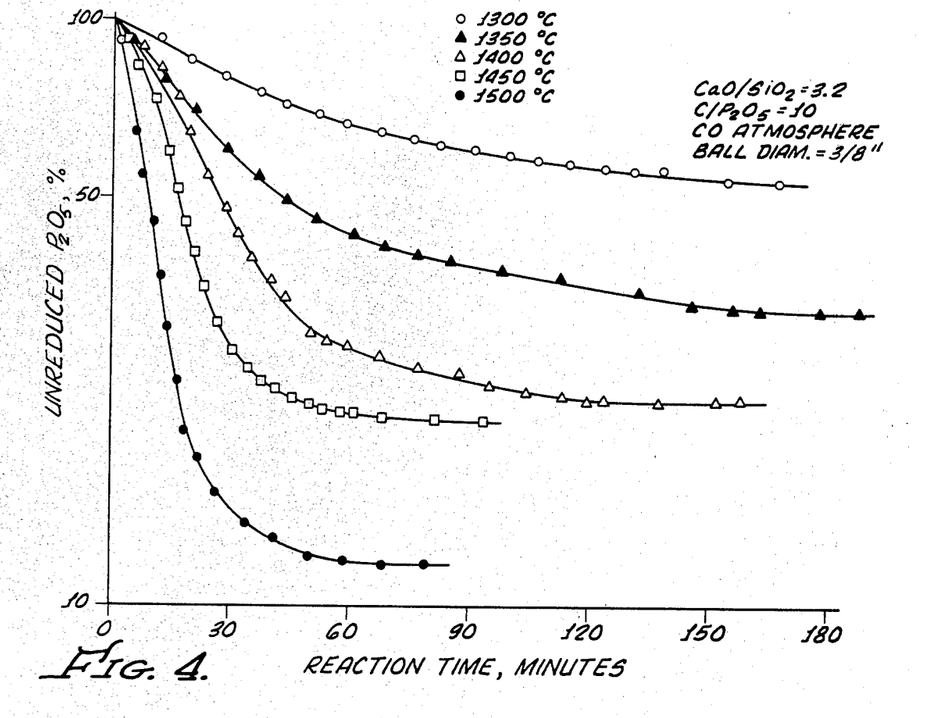
FIG. 4 is a plot of the percent of unreduced florapitite expressed as $P_2O_5$ in sample feed balls as a function of time and temperature.

FIG. 4 is a plot of the amount of unreduced florapitite expressed as percent $P_2O_5$, in the ore ball samples as a function of time at temperatures from approximately 1300° C. to approximately 1500° C. and shows that the reaction rates and the yield of phosphorus are highly dependent upon the reaction temperatures.

It is evident from FIG. 4 that the reduction of $P_2O_5$ is more rapid at higher temperatures and the more complete reduction occurs at higher temperatures. Unfortunately, as hereinbefore noted, at higher temperatures the ore balls may melt, causing agglomoration and the formation of clinkers which may interfere with kiln operation.

Figure 5:
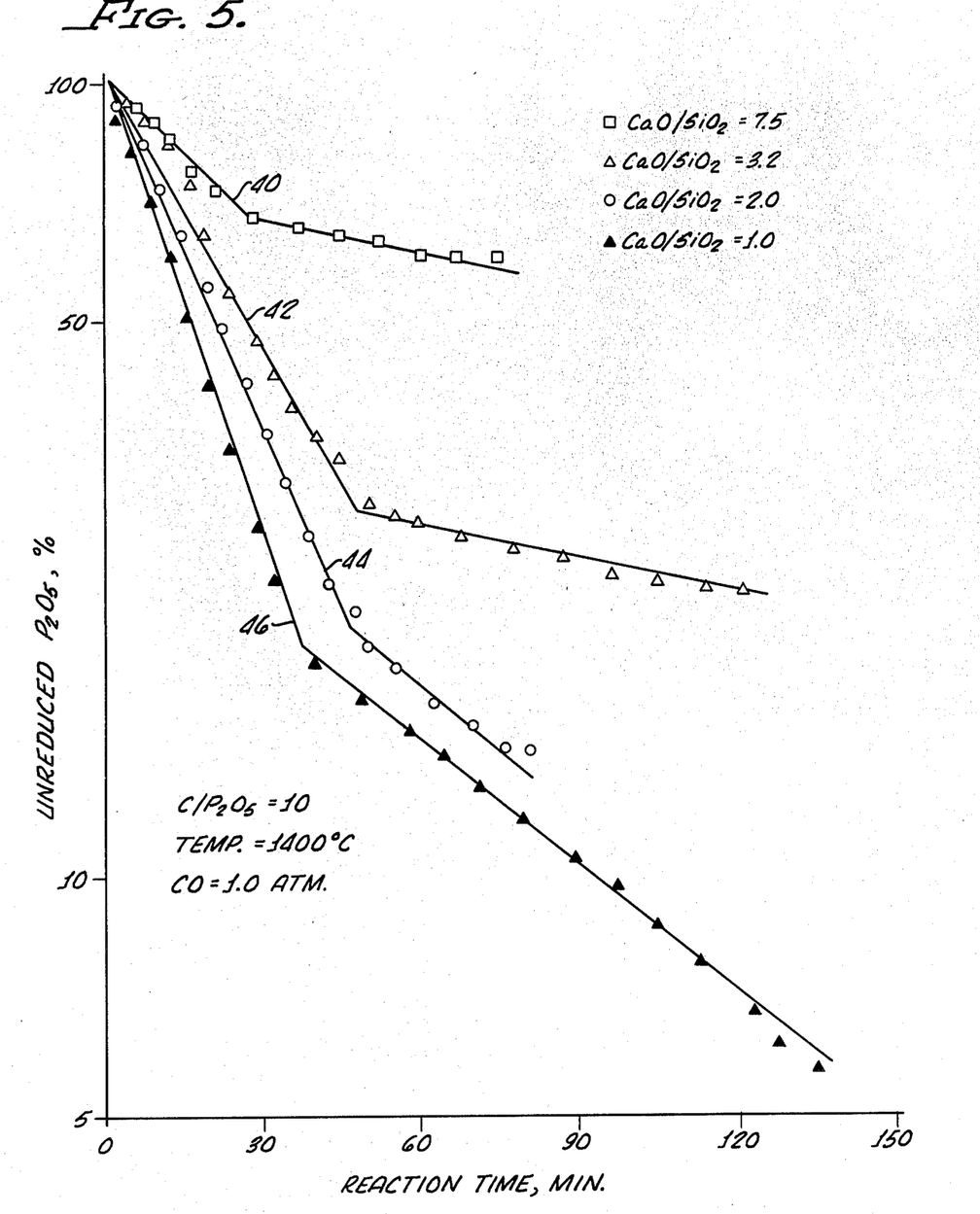
FIG. 5 is a plot of percent unreduced florapatite expressed as $P_2O_5$ as a function of time showing the effect of $CaO/SiO_2$ molar ratio on the amount and rate of reduction of phosphate.

The effect of the CaO to $SiO_2$ mole ratio on the rate of reduction of phosphate is shown in FIG. 5. In FIG. 5 the amount of unreduced florapitite expressed as percent $P_2O_5$ is plotted as a function of reaction time for various $CaO/SiO_2$ mole ratio in the feed mixture at 1400° C., at a carbon monoxide partial pressure of 1 atmosphere and approximately 200% of the stoichiometric amount of carbon necessary to reduce all the florapatite present in the sample. The reaction rates and conversions are sensitive to the $CaO/SiO_2$ mole ratio in the range of 1.0 to 7.5. It is apparent from FIG. 5 that both the amount of florapatite reduction and the rate of reduction, as shown by the slope of the curves 40,42,44,46, increases as the $CaO/SiO_2$ mole ratio is decreased.

It has also been observed that ore ball melting is also dependent on the $CaO/SiO_2$ ratio. Present experiments, including the heating of ore balls having various $CaO/SiO_2$ ratios, have shown that if the $CaO/SiO_2$ is above about 2.5 significant ore ball melting does not occur as long as the amount of alumina in the balls is less than approximately 3% by weight. In view of the dependence of phosphate reduction on the $CaO/SiO_2$ ratio as shown in FIG. 5, the $CaO/SiO_2$ ratio should be between about 2.5 and about 5 and preferably between about 3 and about 4.

Figure 6:
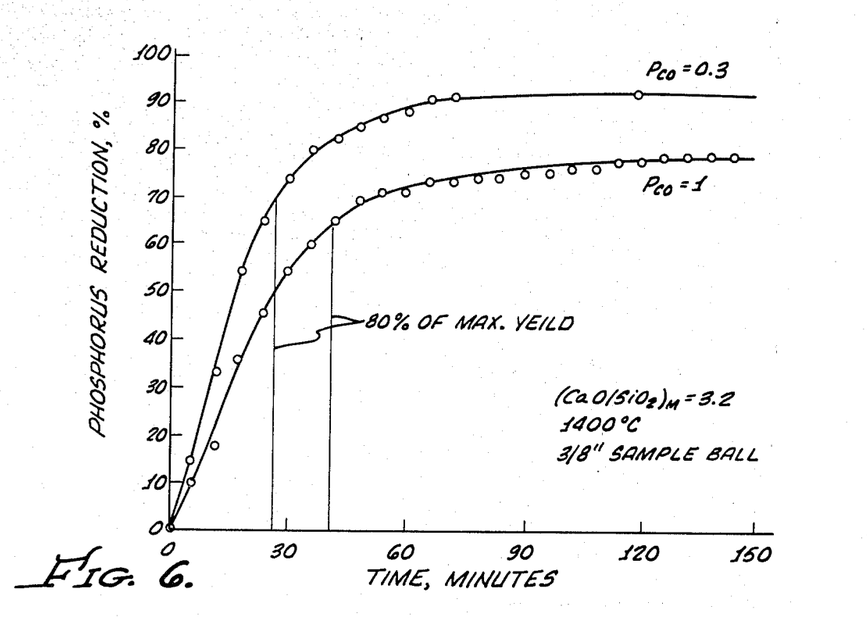
FIG. 6 is a plot of percent phosphorus reduction in sample ore balls as a function of time showing that purging a bed of sample ore balls with inert gas causes the reduction reaction to occur faster and to a greater extent.

Turning now to FIG. 6 there is shown the effect of purging, or passing, an inert gas past the sample ore balls to lower the partial pressure of carbon monoxide thereabout. This was performed by passing $N_2$ gas with 30% carbon monoxide through the gas mixing system (not shown) and into the atmosphere surrounding the sample ore balls, the total gas flow rate being held constant at approximately 400 cc/min. The final conversions of the phosphate ore into phosphorus gas and the initial reaction rates show a strong dependence upon the carbon monoxide partial pressure and gas phase. The driving force for gas motion out of the sample ball is dependent upon the partial pressure gradient between the surface of the sample ball and the inner portions of the sample ball.

Since the concentration gradient carbon monoxide is significantly larger than that of phosphorus ($P_4$), the reaction is more dependent upon the removal of carbon monoxide and hence the partial pressure of carbon monoxide in the gas phase will limit the reaction rate. Since the diffusivity of the $P_4$ is significantly lower than the carbon monoxide, removal of the $P_4$ does not proceed with the same speed as the removal of carbon monoxide. Hence the change in the amount of $P_4$ is significantly less and, therefore, the diffusion rate of the $P_4$ is not significantly increased by purging of the $P_4$ from the surface of the feed ball and the reaction rate is not as affected as with the case of carbon monoxide.

Figure 7:
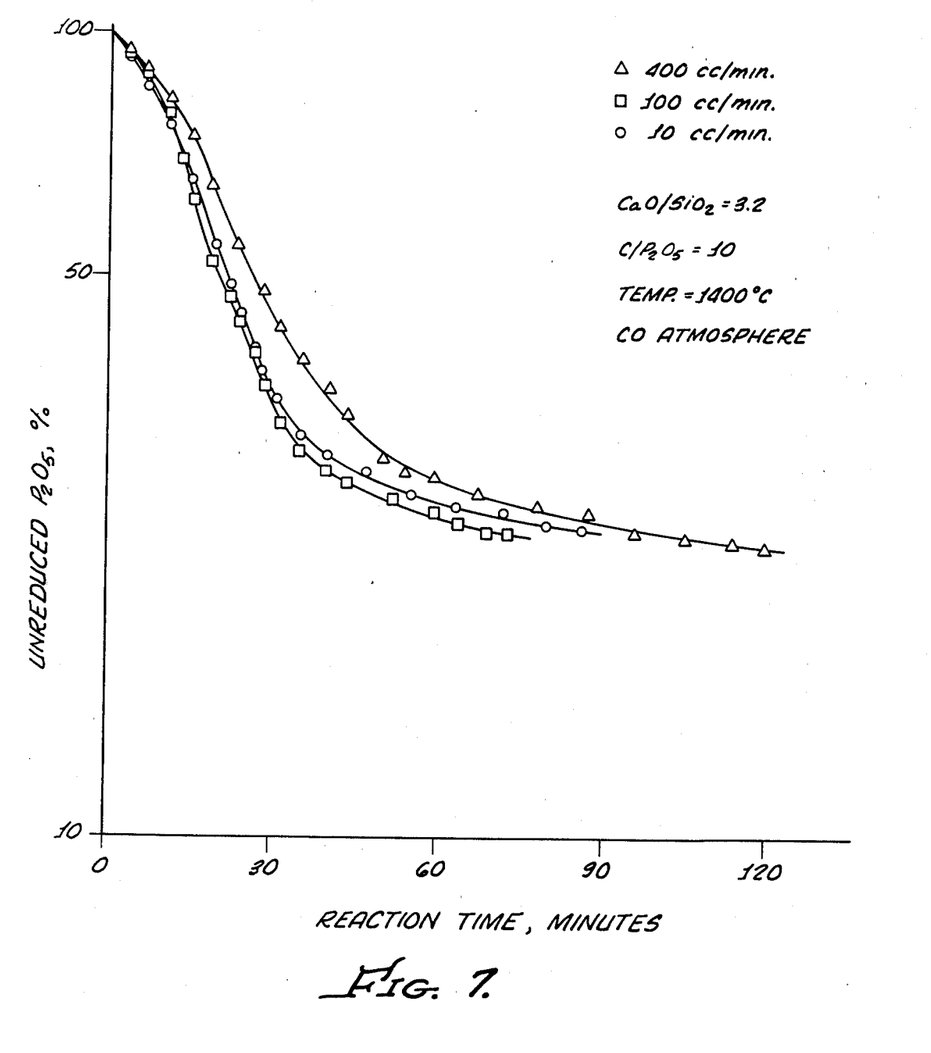
FIG. 7 is a plot of percent unreduced florapitite expressed as $P_2O_5$ as a function of time showing that purging of $P_4$ from sample ore balls does not significantly affect the reductive rate; and, FIG. 8 shows the percent of phosphate reduction as a function of time corresponding to the movement of a porous bed of feed balls along a ported rotary kiln.

This was verified by purging the sample ore ball bed with pure carbon monoxide at flow rates varying from approximately 10 to approximately 400 cc per minute and determining the amount of unreduced $P_2O_5$ by the TGA. Results shown in FIG. 7 indicate that with regard to the movement of $P_4$ on the reduction rate, the limiting factor is the speed at which the $P_4$ diffuses out of the ball rather than removal of $P_4$ from the surface of the ball.

Also shown in FIG. 6 is the result that not only does bed purging enhance the amount of phosphorus reduction, but that the reduction reaction occurs faster with the bed purging than without bed purging. For example, the time to achieve 80% of maximum yield is approximately 25 minutes with bed purging and approximately 40 minutes without any inert gas purge.

As hereinafter discussed in greater detail, this has a significant affect on the size of the kiln necessary, and the overall amount of heat required. For example, since the bed does not have to be kept at reactions temperature as long, a shorter kiln may be used and temperature gradients within the kiln can be more easily controlled because of its shorter length. Additionally, because less heat is required, a lower gas flow within the oxidation zone 30 is required and, as a result, less turbulence to disturb the inert gas separation layer 32 (see FIG. 2) reduces the amount of contact between the oxidation zone 30 and the bed 12.

As hereinbefore pointed out, carbon monoxide does not react to reduce the phosphate ore, hence the introduction, or purging, of the reaction bed of feed balls with carbon monoxide only maintains the partial pressure of carbon monoxide surrounding the feed balls at one atmosphere which, as shown herein, limits the yield of the ore reduction reaction. It can be seen that other gases may be used to purge the porous bed if they do not enter into a reaction with the phosphate ore, silica, or carbon-aceous material and act to purge, or force, carbon monoxide from the bed thus enhancing the reduction reaction between phosphate ore and carbon.

In fact, if stoichiometric amounts of gases, such as air and natural gas (methane) are forced through the reaction bed, the two gases may react to form carbon monoxide, and hydrogen without reacting with the bed, in this instance, the stoichiometric mixture of air and methane acts as an inert gas with respect to the phosphate ore and the nitrogen from the air and hydrogen generated may purge the bed of the carbon monoxide generated therein. The oxygen in the air reacts with the methane at the temperature of the bed before any oxidation of carbon in the bed can occur.

If additional methane is forced into the reaction bed, carbon and hydrogen may be formed without reaction with the phosphorus ore and the carbon so produced may be utilized to replace any carbon burned out of the feed balls during heat-up of the reactor bed before temperatures are reached at which the carbon reduces the phosphorus ore (approximately 1000° C.). Since such added carbon is added to the exterior of the ore balls, reduced agglomeration of the ore balls into clinker occurs and the ore balls, coated with carbon are effectively lubricated to reduce sticking therebetween.

The addition of air methane mixtures is distinct from the iron ore reduction processes which may add a gaseous reduction agent or fuel (such as CO or $CH_4$) to an iron ore reduction process where CO is effective in reducing the iron ore.

Figure 8:
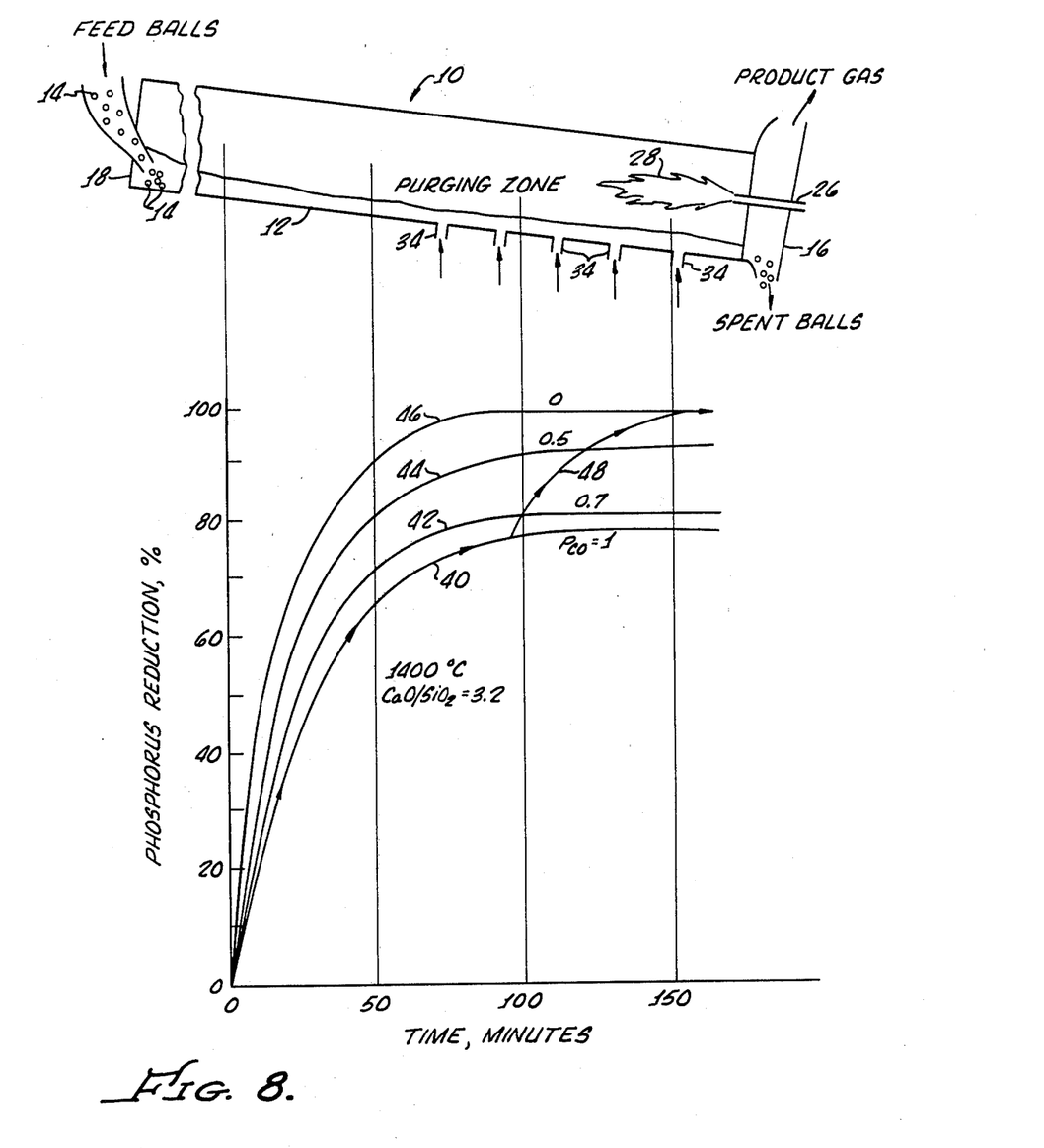

Referring to FIG. 8, there is shown a representation of a 2.75 foot by 30 foot rotary type kiln 10 with a bed 12 of feed balls 14 and a corresponding plot of percent phosphate reduction within the feed balls as a function of time and partial pressure of carbon monoxide surrounding the feed balls 14 as the feed balls move from end portion 18 toward the flame 28 and end portion 16. The plot is based on the experimental results from TGA analysis. The plot is aligned with the kiln 10 in FIG. 8 in order to show the amount of phosphate reduction as the feed balls travel the length of the kiln, the reaction time, or transit time of the feed balls being approximately 150 minutes. As the feed balls move from the cooler end 18 of the kiln to the hotter end 16 of the kiln 10, they are heated and the reduction reaction occurs according to the reaction as hereinbefore discussed. The curves 40 through 46 indicate the amount of reductive reaction which would occur under carbon monoxide partial pressure ($P_{co}$) of 1 to 0 atmosphere respectively as indicated in FIG. 8 and curve 48 represents the enhanced reaction rate caused by purging the bed 12 with an inert gas through ports 34 proximate the hotter end 16 of the kiln 10, and the resultant greater percent reduction of phosphate in the feed balls.

It is evident from FIG. 8 that at approximately 1400° C. and a CO partial pressure of approximately 1 only about 75% of the phosphate in the feed balls 14 is reduced, and that additional reduction of the phosphate in the feed balls could require either higher kiln temperature or a longer kiln.

The following examples are presented by way of illustration only and are not to be considered limiting to the present invention.

EXAMPLE 1

The raw material mix contained 100 parts phosphate ore, 9 parts silica, and 25.5 parts calcined petroleum coke. The phosphate ore analyzed 30.1 percent $P_2O_5$, 43.7 percent CaO, 1.2 percent alumina, 3.6 percent fluorine, and 8.4 percent silica, all by weight, and was ground in an open circuit ball mill to 77% passing a 200-mesh screen and 65% a 325-mesh screen. The silica flow assayed 98% $SiO_2$ and was ground to 96% passing a 200-mesh screen, and 83% passing a 325-mesh screen. The calcined petroleum coke had a fixed carbon content of 98% and was ground to 59% passing a 200-mesh screen and 39% passing a 325-mesh screen. The raw material mix was blended with 15% by weight of water on a balling pan to give balls which were between 7/16 and 9/16 inches in diameter. The balls were dried to less than 1% moisture by downdraft tempered combustion gases on a traveling grate. The dried feed balls were fed at a rate of 350 pounds per hour into a rotary kiln 2.75 feet in diameter inside the refractories and 30 feet long. The iln was fired by a natural gas and air burner. The ore balls were heated to a maximum temperature of 1420° C. where 47% of the phosphorus was extracted from the ore and transported as a phosphorus pentoxide gaseous specie with the gas phase out of the kiln. The kiln solids at this temperature were already forming fist-sized clinkers and higher temperatures could not be obtained without severe clinker formation which would terminate kiln operation.

The solids discharging from the kiln were found to contain less than 25% of the carbon originally charged to the kiln. It was found that the amount of carbon oxidized from the kiln solids was strongly dependent on the gas velocity in the kiln. At high gas velocities the gases became more turbulent and more carbon burned out of the solids. The range was from 15 to more than 80 percent of the carbon. Oxygen and preheated combustion air additions to the burner were used to maintain kiln temperatures at low kiln gas velocities. Although the oxidation of carbon from the bed was significantly reduced at low gas velocities, the phosphorus yield was not improved because the maximum temperature peaked sharply at the hot end of the kiln and the solids were at the reaction temperature for too short a period to allow the reaction to proceed to high yields.

EXAMPLE 2

A bed purging system of 96 ports arranged in 8 rows each spaced equidistant around the kiln periphery of Example 1 so as to cover uniformly the hot 50% of the kiln was installed. The ports were made by drilling 5/16-inch holes through the kiln shell and refractory. Each port was attached to a header and valving system so that nitrogen or air could be added through the port during any desired part of the kiln rotation.

A test was then run using the bed purging system. Thirty standard cubic feet per minute of nitrogen was added to ports as they passed under the bed and air was added through the ports as they passed over the bed to achieve a uniform solids temperature of 1390° C. over nearly one-half of the kiln length. The same phosphate ore-coke-silica agglomerates used in Example 1 were again charged to the kiln at 350 pounds per hour. The phosphorus extraction had improved to 84%, the carbon oxidized from the bed was reduced to 8%, and the kiln solids remained as unagglomerated balls sintered to a slightly smaller diameter.

Although there has been described hereinabove a specific process for reducing phosphate ore in accordance with the invention for purposes of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

What is claimed is:

1. A process for reducing phosphate ore including fluoride and alumina impurities, comprising the steps of:
   beneficiating the phosphate ore to reduce the alumina impurities therein to less than about three percent by weight, said fluoride impurities remaining in the beneficiated phosphate ore;
   mixing the beneficiated phosphate ore containing said fluoride impurities with silica and solid carbonaceous material in amounts to produce a feed mixture having a $CaO/SiO_2$ mole ratio within the range of from about 2.5 to about 5.0;
   forming the feed mixture into agglomerates; and,
   heating, by exposure to a flame, a porous bed of agglomerated feed mixture particles to a temperature sufficient to reduce the phosphate in the feed mixture by reaction with carbonaceous material to form elemental phosphorus vapor without substantial melting of the porous bed.

2. The process of claim 1 wherein the alumina content of the beneficiated phosphate ore is less than about one percent by weight.

3. A process for reducing phosphate ore including fluoride and alumina impurities, comprising the steps of:
   beneficiating the phosphate ore to reduce the alumina impurities therein to less than about three percent by weight, said fluoride impurities remaining in the treated phosphate ore;
   mixing the beneficiated phosphate ore containing said fluoride impurities with silica and solid carbonaceous material in amounts to produce a feed mixture having a $CaO/SiO_2$ mole ratio within the range of about 2.5 to 5.0;
   forming the feed mixture into agglomerates;
   heating, by exposure to a flame, a porous bed of agglomerated feed mixture particles to a temperature sufficient to reduce the phosphate in the feed mixture by reaction with carbonaceous material to form elemental phosphorous vapor without substantial melting of the porous bed; and,
   purging the porous bed with an inert gas in order to drive the reaction between the phosphate ore and the solid carbon towards complete reduction of the phosphate ore by removal of carbon monoxide from the porous bed, said inert gas being non-reactive with the phosphate ore, carbon, elemental phosphorus and the carbon monoxide.

4. A process for producing phosphorus pentoxide from phosphate ore including fluoride and alumina impurities comprising the steps of:
   beneficiating the phosphate ore to reduce the alumina impurities therein to less than about three percent by weight, said fluoride impurities remaining in the beneficiated phosphate ore;
   mixing the beneficiated phosphate ore containing said fluoride impurities with silica and solid carbonaceous material in amounts to produce a feed mixture having a $CaO/SiO_2$ mole ratio within the range of about 2.5 to about 5.0;
   forming the feed mixture into agglomerates;
   heating, by exposure to a flame, a porous bed of agglomerated feed mixture particles to a temperature sufficient to reduce the phosphate in the feed mixture by reaction with the solid carbonaceous material to form elemental phosphorus vapor without substantial melting of the porous bed; and,
   providing sufficient oxygen-containing gas to cause oxidation of the elemental phosphorus vapor within an oxidation zone to produce refined phosphrus pentoxide and to heat the porous bed, said oxidation zone being disposed over said porous bed.

5. The process of claim 1 or 4 further comprising the step of supporting the porous bed with a magnesia-chromia refractory bonded with dicalcium silicate.

6. A process for producing refined phosphorus pentoxide from phosphate ore including fluoride and alumina impurities, comprising the steps of:
   beneficiating the phosphate ore to reduce the alumina impurities therein to less than about three percent by weight, said fluoride impurities remaining in the beneficiated phosphate ore;

mixing the beneficiated phosphate ore containing said fluoride impurities with silica and solid carbonaceous material in amounts to produce a feed mixture having a $CaO/SiO_2$ mole ratio within the range of about 2.5 to about 5.0;

forming the feed mixture into agglomerates;

heating, by exposure to a flame, a porous bed of agglomerated feed mixture particles to a temperature sufficient to reduce the phosphate in the feed material by reaction with the solid carbonaceous material to form elemental phosphorus vapor without substantial melting of the porous bed;

purging the porous bed with an inert gas in order to drive the reaction between the phosphate ore and the solid carbon towards complete reduction of the phosphate ore by removal of carbon monoxide and elemental phosphorus vapor from the porous bed, said inert gas being non-reactive with the phosphate ore, carbon, elemental phosphorus vapor and the carbon monoxide; and, providing sufficient oxygen-containing gas to cause oxidation of the elemental phosphorus vapor within an oxidation zone to produce refined phosphorus pentoxide and to heat the porous bed, said oxidation zone being disposed over said porous bed.

7. The process of claim 6 further comprising the step of providing sufficient oxygen-containing gas to cause oxidation of the carbon monoxide within the oxidation zone to heat the porous bed.

8. The process of claim 6 or 7 wherein a sufficient quantity of inert gas is purged through the porous bed to inhibit oxidation of the elemental phosphorus vapor and carbonaceous material within the porous bed.

9. The process of claim 6 and 7 wherein a sufficient quantity of inert gas is purged through the porous bed to form a boundary layer of inert gas between the porous bed and the oxidation zone.

10. The process of claim 1 or 3 further including the step of agitating the porous bed to enhance both heat transfer within the porous bed and heat transfer from surface areas of the porous bed to internal portions of the porous bed.

11. The process of claim 1, 3, or 6 wherein the porous bed is heated to a temperature of at least 1000° C.

12. A process for producing refined phosphorus pentoxide from phosphate ore including fluoride and alumina impurities comprising the steps of:

beneficiating phosphate ore to reduce the alumina impurities therein to less than about three percent by weight, said fluoride impurities remaining in the beneficiated phosphate ore;

mixing the beneficiated phosphate ore containing said fluoride impurities with silica and solid carbonaceous material in amounts to produce a feed mixture having a $CaO/SiO_2$ mole ratio within the range of about 2.5 to 5.0;

forming the feed mixture into agglomerates;

heating, by exposure to an oxidation zone within a rotary-type kiln, a porous bed of agglomerated feed mixture particles to a temperature sufficient to reduce the phosphate in the feed mixture by reaction with the solid carbonaceous material to form elemental phosphorus vapor without substantial melting of the porous bed;

purging the porous bed with an inert gas in order to drive the reaction between the phosphate ore and carbonaceous material towards complete reduction of the phosphate ore by removal of carbon monoxide from the porous bed, said inert gas being non-reactive with the phosphate ore, carbonaceous material, elemental phosphorus vapor, and the carbon monoxide;

introducing into the rotary-type kiln sufficient oxygen-containing gas to cause oxidation of the elemental phosphorus vapor within the oxidation zone to produce refined phosphorus pentoxide and to heat the porous bed; and, rotating the kiln in order to agitate the porous bed to enhance heat transfer therein.

13. The process of claim 12 further comprising the step of introducing sufficient oxygen-containing gas to cause oxidation of the carbon monoxide within the oxidation zone to heat the porous bed.

14. The process of claim 12 or 13 wherein a sufficient quantity of inert gas is purged through the porous bed to form a boundary layer of inert gas between the porous bed and the oxidation zone, said boundary layer reducing oxidation of the elemental phosphorous vapor, carbonaceous material and carbon monoxide within the porous bed.

15. A process for producing refined phosphorus pentoxide from phosphate ore including fluoride and alumina impurities, comprising the steps of:

beneficiating the phosphate ore to reduce the alumina impurities therein to less than about three percent by weight, said fluoride impurities remaining in the beneficiated phosphate ore;

mixing the beneficiated phosphate ore containing said fluoride impurities with silica and solid carbonaceous material in amounts to produce a feed mixture having a $CaO/SiO_2$ mole ratio within the range of about 2.5 to 5.0;

forming the feed mixture into agglomerates;

heating, by exposure to an oxidation zone within a rotary kiln, a porous bed of agglomerated feed mixture particles to a temperature sufficient to reduce the phosphate ore in the feed mixture by reaction with the solid carbonaceous material to form elemental phosphorus vapor without substantial melting of the porous bed;

driving the chemical reaction between the phosphate ore and the solid carbonaceous material towards complete reduction of the phosphate ore by removal of the reaction products comprising elemental phosphorus vapor and carbon monoxide, from the porous bed by purging the porous bed with an inert gas, said inert gas being non-reactive with the phosphate ore, carbonaceous material, elemental phosphorus vapor and the carbon monoxide;

oxidizing the elemental phosphorus vapor within the oxidation zone to produce refined phosphorus pentoxide and to heat the porous bed; and, rotating the kiln in order to agitate the porous bed to enhance heat transfer therein.

16. A process for producing phosphoric acid from phosphate ore including fluoride and alumina impurities, comprising the steps of:

beneficiating the phosphate ore to reduce the alumina impurities therein to less than about three percent by weight, said fluoride impurities remaining in the beneficiated phosphate ore;

mixing the beneficiated phosphate ore containing said fluoride impurities with silica and solid carbonaceous material in amounts to produce a feed mixture having a $CaO/SiO_2$ mole ratio within the range of about 2.5 to about 5.0;

forming the feed mixture into agglomerates;

heating, by exposure to an oxidation zone within a rotary kiln, a porous bed of agglomerated feed mixture particles to a temperature sufficient to reduce the phosphate ore in the feed mixture by reaction with the solid carbonaceous material to form elemental phosphorus vapor without substantial melting of the porous bed, said rotary kiln being lined with a magnesium-chromia refractory bonded with dicalcium silicate;

purging the porous bed with nitrogen gas in order to drive the reaction between the phosphate ore and the solid carbonaceous material towards complete reduction of the phosphate ore by removal of carbon monoxide and the elemental phosphorus vapor from the porous bed, said nitrogen being used in an amount sufficient to inhibit oxidation of the phosphorus vapor, solid carbonaceous material and carbon monoxide within the porous bed;

causing oxidation of the elemental phosphorus vapor within the oxidation zone to produce phosphorus pentoxide and heat to heat the porous bed, said oxidation zone being disposed over said porous bed;

causing oxidation of the carbon monoxide within the oxidation zone to heat the porous bed;

rotating the kiln in order to agitate the porous bed to enhance heat transfer therein;

removing the phosphorus pentoxide from the oxidation zone; and, adding water to the phosphorus pentoxide to form phosphoric acid.

17. The process of claim 15 or 16 wherein the porous bed is heated to a temperature of at least 1000° C.

18. A process for producing refined phosphorus pentoxide from phosphate ore including fluoride and alumina impurities, comprising the steps of:

beneficiating the phosphate ore to reduce the alumina impurities therein to less than about three percent by weight, said fluoride impurities remaining in the beneficiated phosphate ore;

mixing the beneficiated phosphate ore containing said fluoride impurities with silica and solid carbonaceous material in amounts to produce a feed mixture having a $CaO/SiO_2$ mole ratio within the range of about 2.5 to about 5.0;

forming the feed mixture into agglomerated particles;

heating by exposure to an oxidation zone within a rotary-type kiln, a porous bed of agglomerated feed mixture particles to a temperature sufficient to reduce the phosphate ore in the feed mixture by reaction with the solid carbonaceous material to form elemental phosphorus vapor without substantial melting of the porous bed;

purging the porous bed with a gas in order to drive the reaction between the phosphate ore and the solid carbon-aceous material towards complete reduction of the phosphate ore by removal of carbon monoxide and the element phosphorus vapor from the porous bed to an oxidation zone disposed over the porous bed;

supplying sufficient oxygen containing gas to the oxidation zone to oxidize the phosphorus vapor to phosphorus pentoxide and to heat the porous bed; and, rotating the kiln in order to agitate the porous bed to enhance transfer therein.

19. The process of claim 18 wherein the gas comprises a mixture of air and methane, said methane and oxygen in the air being present in amounts equal to the stoichiometric amounts necessary to react all the oxygen in the air with the methane to form carbon monoxide and hydrogen.

20. The process of claim 18 wherein the inert gas comprises a mixture of air and methane, said methane being present in an amount greater than the stoichiometric amount necessary to react with all the oxygen in the air to form carbon monoxide and hydrogen.

* * * * *